L. A. YOUNG.
SPRING CONSTRUCTION.
APPLICATION FILED AUG. 21, 1916.

1,230,260.

Patented June 19, 1917.
2 SHEETS—SHEET 1.

INVENTOR
Leonard A. Young
BY Ralzemond A. Parker
ATTORNEY

L. A. YOUNG.
SPRING CONSTRUCTION.
APPLICATION FILED AUG. 21, 1916.
1,230,260.
Patented June 19, 1917.
2 SHEETS—SHEET 2.
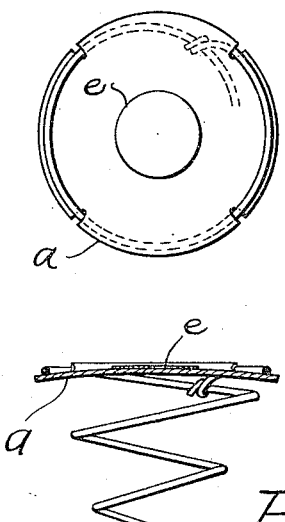
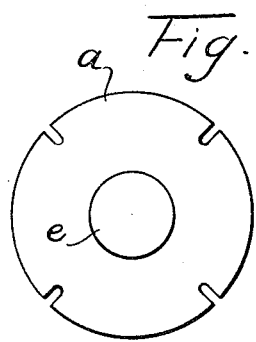
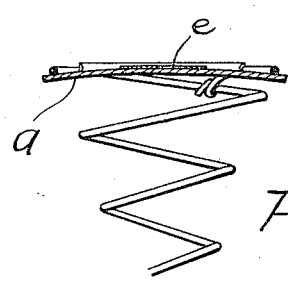
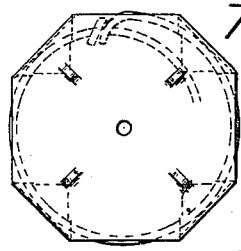
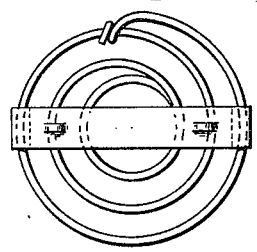
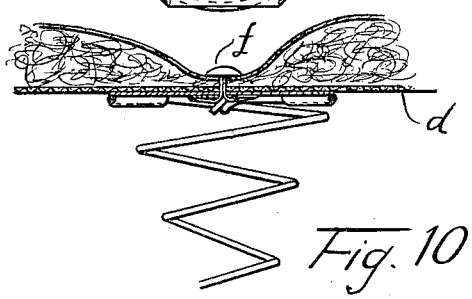
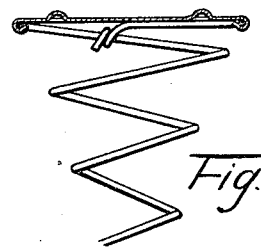
INVENTOR
Leonard A. Young
BY Ralzemond A. Parker
ATTORNEY

UNITED STATES PATENT OFFICE.

LEONARD A. YOUNG, OF HIGHLAND PARK, MICHIGAN.

SPRING CONSTRUCTION.

1,230,260.          Specification of Letters Patent.     Patented June 19, 1917.

Application filed August 21, 1916. Serial No. 115,959.

*To all whom it may concern:*

Be it known that I, LEONARD A. YOUNG, a citizen of the United States, residing at Highland Park, county of Wayne, State of Michigan, have invented a certain new and useful Improvement in Spring Constructions, and declare the following to be a full, clear, and exact description of the same, such as will enable others skilled in the art to which it pertains to make and use the same, reference being had to the accompanying drawings, which form a part of this specification.

This invention relates to what is thought to be a novel way of affording a supporting surface for the upholstering that covers a spring construction. It affords a maximum supporting surface for the upholstering so as to preclude the same dropping down between the individual spring elements and yet at the same time it presents a plurality of independently yieldable elements in no way interfering with the flexible and yieldable character of the spring construction.

In the drawings,—

Fig. 6 is a plan view of a still further modification.

Fig. 7 is an elevation partly in cross section of such modification.

Fig. 8 is a detail view of the plate shown in Figs. 6 and 7.

Fig. 9 is a fourth modification in plan.

Fig. 10 is a side elevation and section of the same, showing the upholstering in place.

Figs. 11 and 12 show views of a fifth modification.

The purpose of this invention is to afford a more continuous supporting surface for the upholstering. In the average spring construction the area of the entire supporting surface that contacts the upholstering is very small as usually nothing but cross wires and the top coils of the helical springs support the upholstering. It is the object of this invention to greatly increase the area in contact with the upholstering and yet preserve the individual yielding characteristics of the individual springs. To this end the top coil of each of the springs which are here shown as of the hour-glass type, is provided with a supporting plate *a*.

Figure 2:
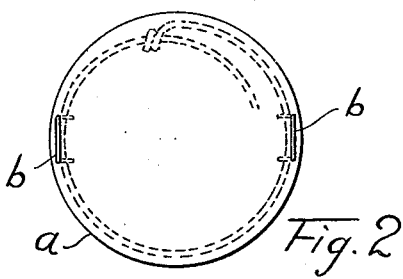
Fig. 2 is a plan view of one of the individual spring elements.
Figure 3:
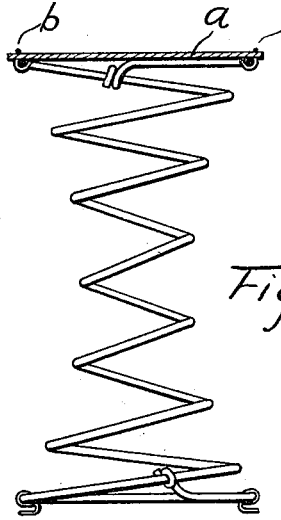
Fig. 3 is a side elevation of the same with the supporting plate in cross section.

In modification one (Figs. 2 and 3), this paper-board plate *a* is clipped to the top coil by means of the wire clips *b*.

Figure 4:
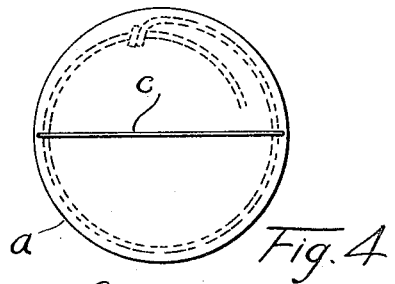
Fig. 4 is a plan view of a modified form of spring element.
Figure 5:
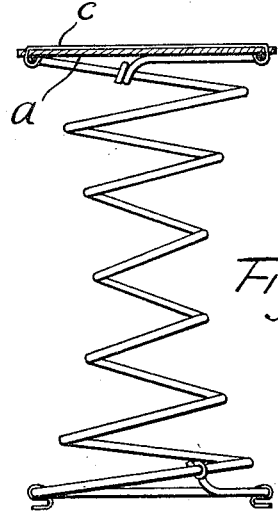
Fig. 5 is an elevation of this spring element and a cross section of the plate of the modification shown in Fig. 4.

In modification two (Figs. 4 and 5), the paper-board plate *a* is wired to the top coil by the diametrically extending wire *c* protruding through the plate at its ends and turned over the coil as shown in Fig. 5.

Modification three (Figs. 6, 7 and 8), comprises a four-notched paper-board disk, the notches being on the periphery and on the quarter points of the circle. This allows the plate *a* to be assembled upon the top coil of the spring by having the alternate portions between the notches alternately above and below the wire of the top coil, as shown in Figs. 6 and 7.

In modification four (Figs. 9 and 10), a brass or other metal plate is used with the corners turned under the top coil as shown in Figs. 9 and 10.

In modification five (Figs. 11 and 12), a simple cross strap is used. Of course this does not approximate the area secured by the plates by considerable, and hence this device is not nearly as efficient as those already described.

The card-board plates not only greatly increase the supporting surface but further accomplish a very useful function in providing a sound-deadening agency on the edges of the coil so that they will not clash together as would be the case in ordinary spring constructions in which the springs are substantially free to tilt.

Figure 1:
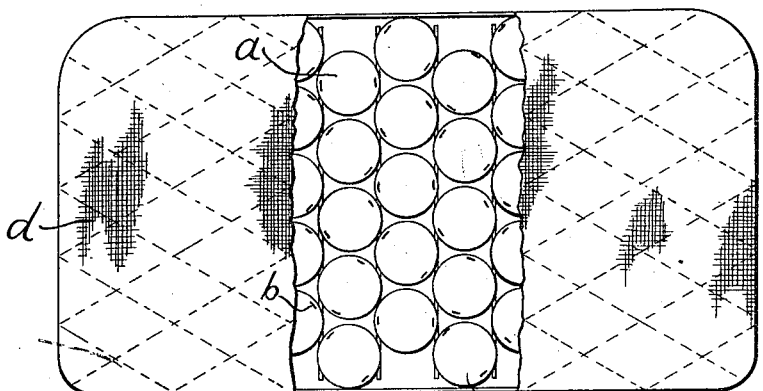
Figure 1 is a plan view with part of the covering fabric broken away.

It is desirable to leave the individual spring elements including the supporting plates, free except for an attachment to the top fabric *d* which is stretched over the spring. This attachment may be secured as shown in Fig. 1 by means of stitching with a heavy cord or it may be accomplished as shown in Figs. 6 and 7 by a double adhesive-faced spot or piece of tape *e*, or it may be accomplished as shown in Fig. 10 by means of leaving a central aperture in the plate and using a pronged pin or button *f*.

What I claim is:

1. In a spring construction, the combination of a plurality of coiled springs, the top coils of which are provided with card-board plates having the capacity to be fitted within the coils and so shaped on the margins as to hold themselves to the coils.

2. In a spring construction, the combination of a plurality of coiled springs, plates fitting into the top whirls of the springs, and each plate peripherally notched to allow the substance intervening between the notches to be alternately disposed above and below the wire of the top whirl.

In testimony whereof, I sign this specification.

LEONARD A. YOUNG.

Copies of this patent may be obtained for five cents each, by addressing the "Commissioner of Patents, Washington, D. C."